Figure 6:
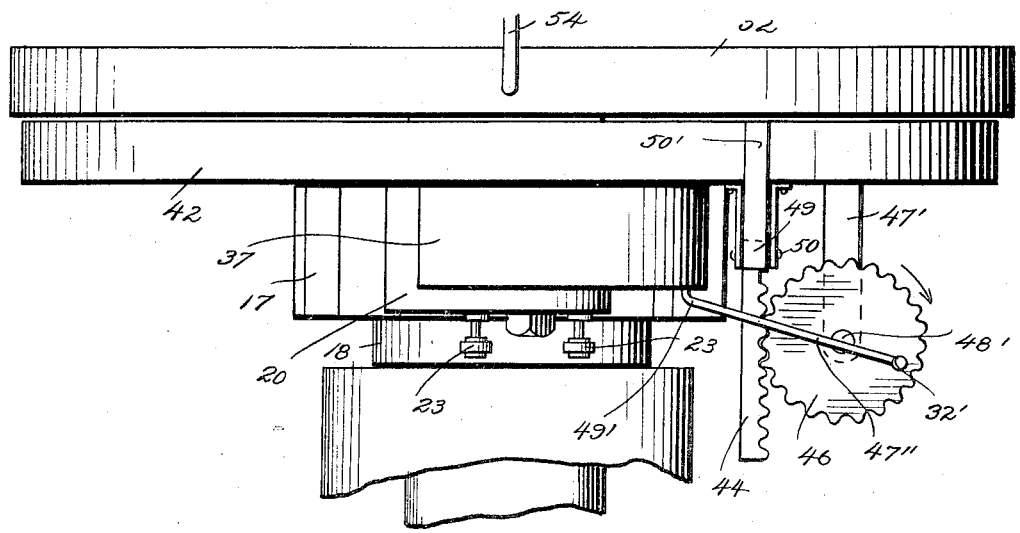

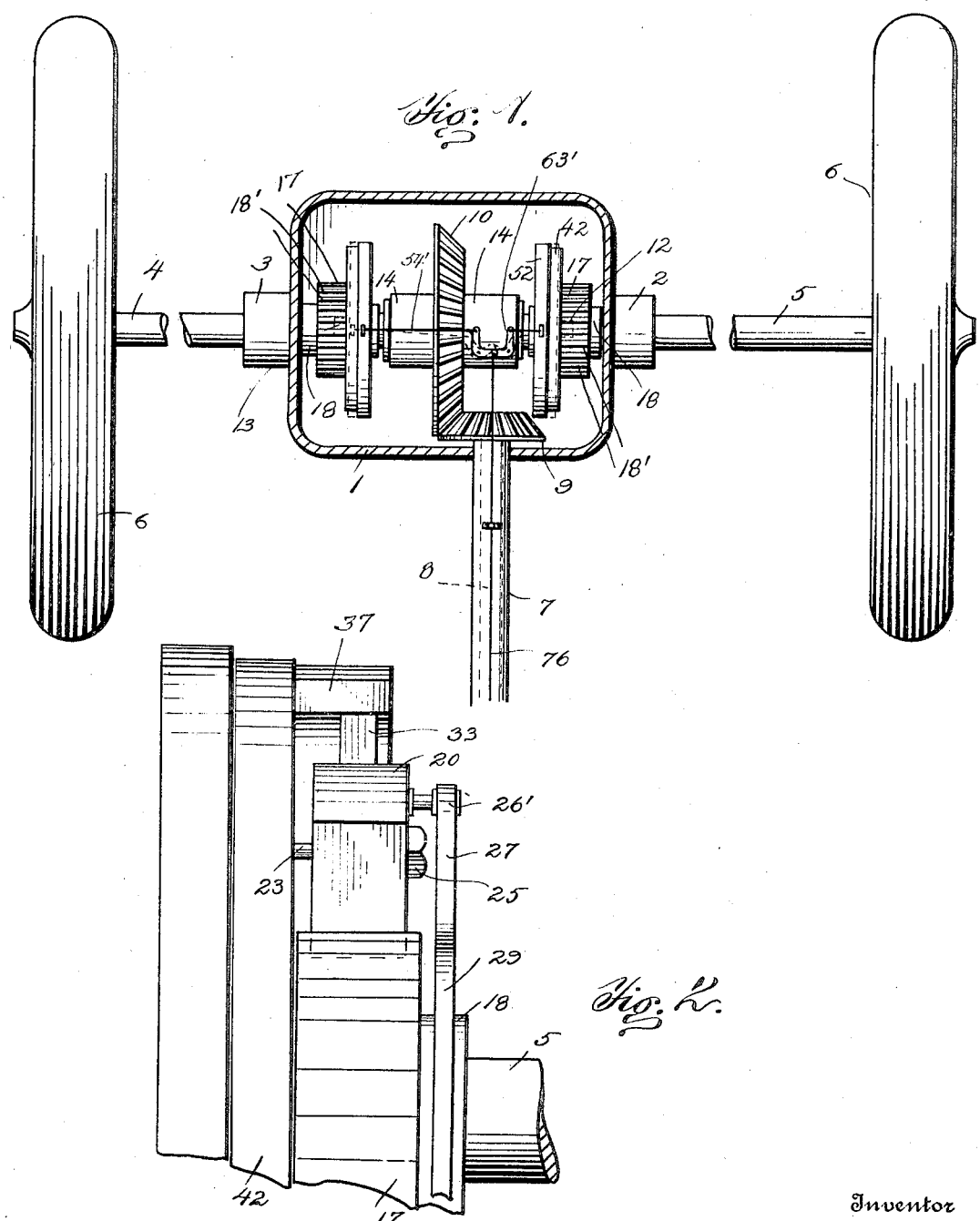

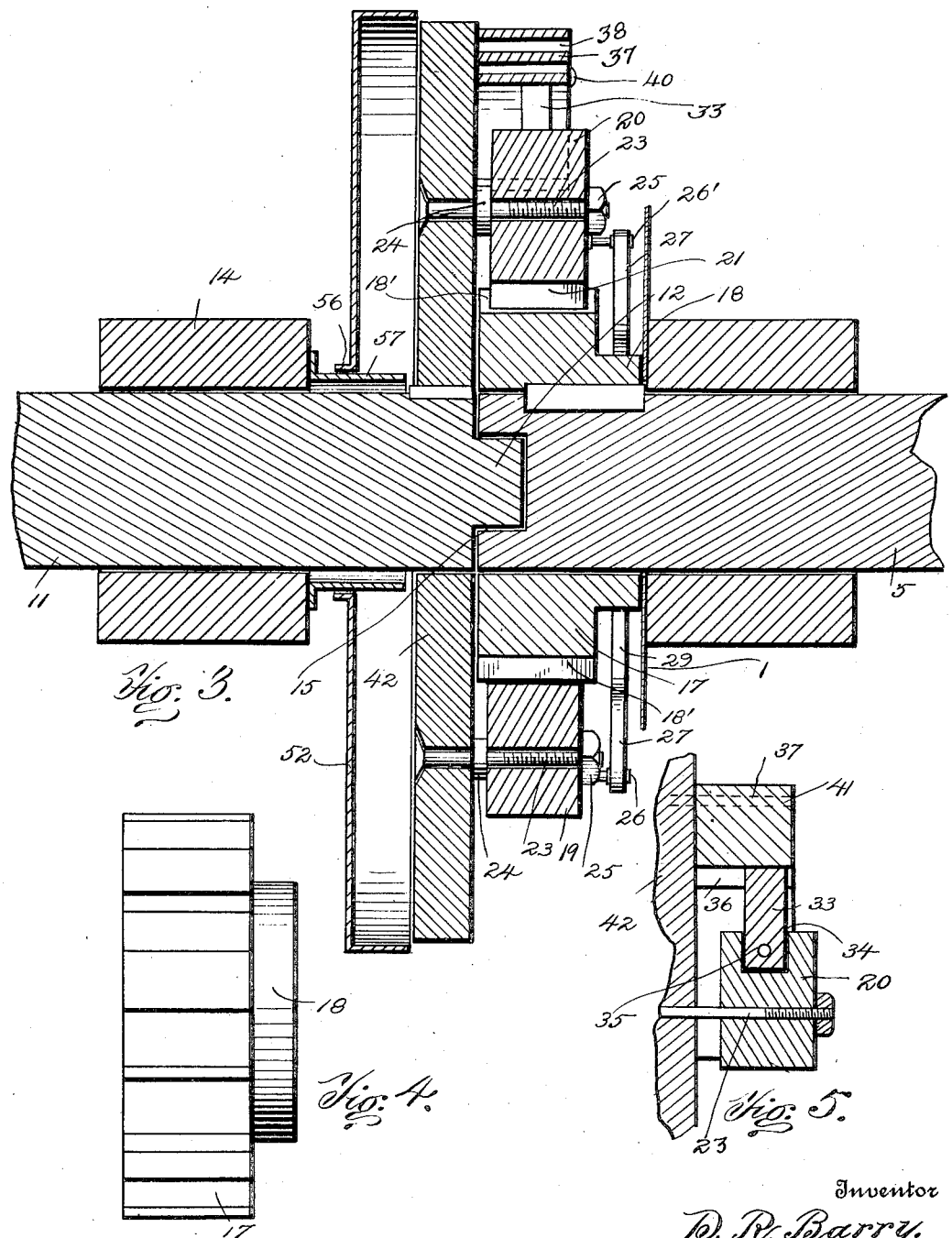

D. R. BARRY.
FRICTION CLUTCH.
APPLICATION FILED DEC. 6, 1911.

1,104,400.

Patented July 21, 1914.
4 SHEETS—SHEET 3.

Witnesses
M. P. McKee
L. C. Bobys

Inventor
D. R. Barry.
By Alex J. Wedderburn, Jr.
Attorney

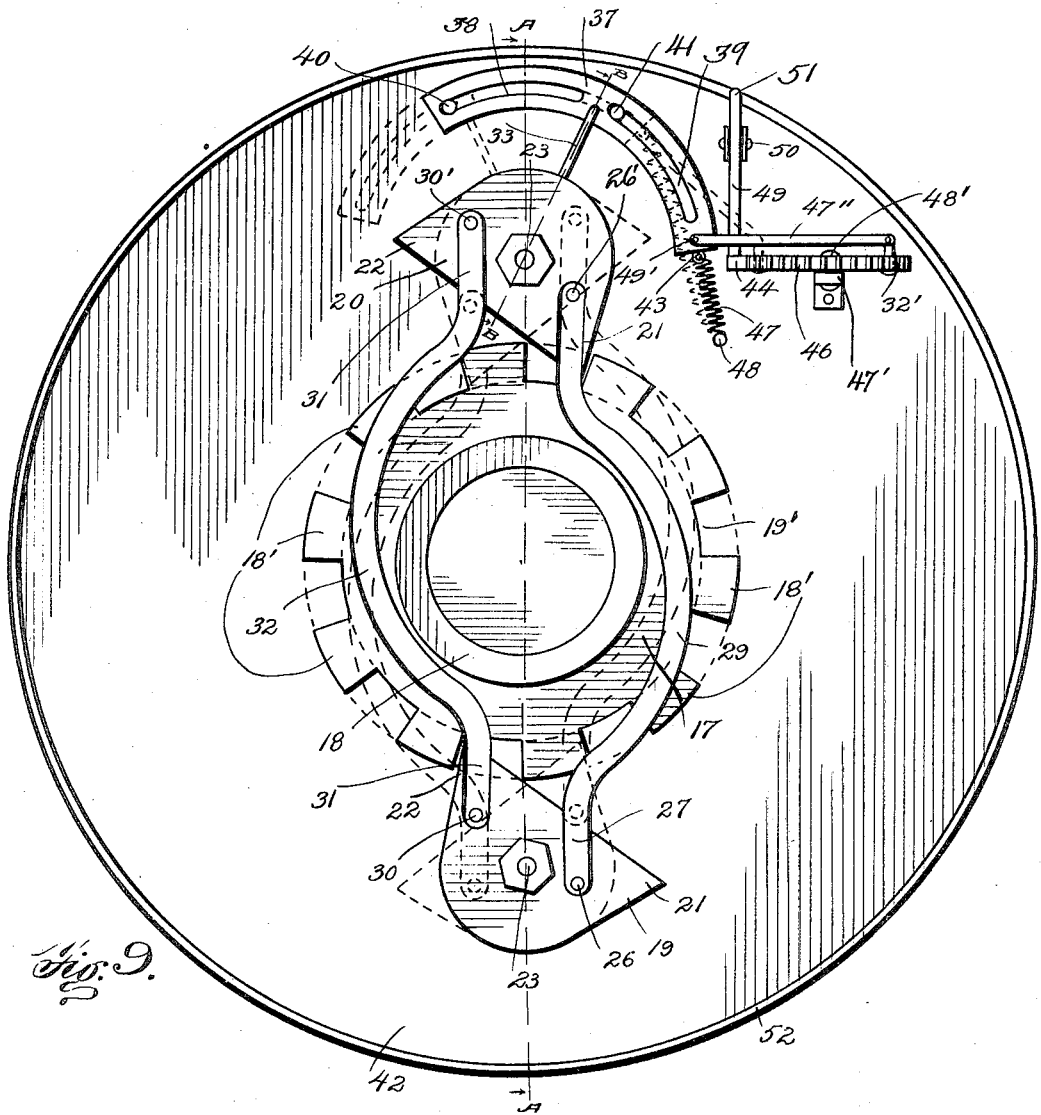
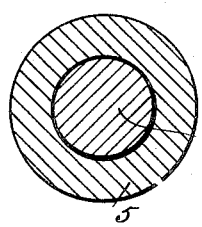

UNITED STATES PATENT OFFICE.

DAVID REDMOND BARRY, OF BEAUMONT, TEXAS.

FRICTION-CLUTCH.

1,104,400.  Specification of Letters Patent.  Patented July 21, 1914.

Application filed December 6, 1911. Serial No. 664,156.

*To all whom it may concern:*

Be it known that I, DAVID REDMOND BARRY, a citizen of the United States, residing at Beaumont, in the county of Jefferson and State of Texas, have invented certain new and useful Improvements in Friction-Clutches, of which the following is a specification.

This invention relates to improvements in friction clutches, and more particularly to means for setting in motion rotary members and arranged to permit one of said members to partake of a relatively more rapid rotation than can be transmitted by the actuating source.

The object of my invention is to provide a simple, efficient and inexpensive friction clutch which may be used in situations requiring a perfect control of the rotary members concerning which the independent movement of one of said members is a primary requisite.

My friction clutch may find ready application in the propulsion of automobiles and similar vehicles where provision must be made in the driving mechanism for accommodating the rotation of the outer driven wheel when the vehicle is rounding a curve, and it has been proposed to use a differential train of gearing for giving the desired relative movement to the driven wheels, but such devices have been costly and when one of the uniform rotary members of the gear should become inoperative it was necessary to stop the vehicle; but it is a leading feature of my invention to provide means which are driven directly from the motor and are arranged to drive the axle upon which the driven wheels are mounted and which may be forced under the influence of the faster wheel to assume an inoperative position as to this wheel so that relative faster rotation of the outer wheel may take place. In this connection the means hereinafter to be described includes mechanism for accommodating the friction clutch to a reverse driving of the wheels of the vehicle and also a tension device for more perfectly controlling the action of said clutch.

With the above and other objects in view my invention consists in the combination, arrangement and details of construction shown in the drawings and then more particularly pointed out in the appended claims.

Figures 7, 8:
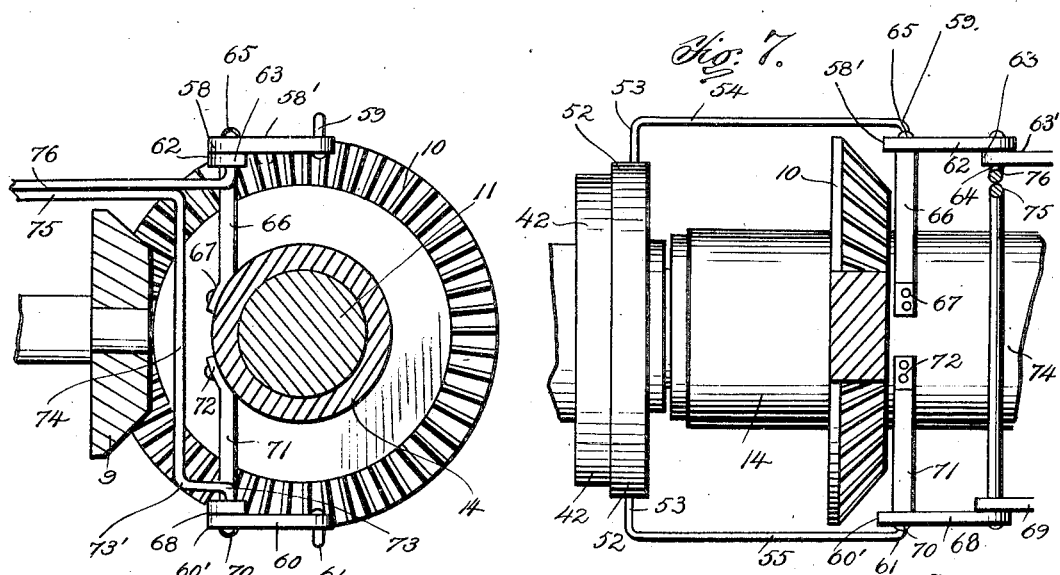

Similar reference characters designate similar parts throughout the respective views of the drawings wherein:

Figure 1 is a top plan view partly in section of the casing in which the friction clutch is operatively arranged, Fig. 2 is a fragmental detail elevation of a friction pawl to be described, Fig. 3 is a vertical sectional elevation of the wedging mechanism forming part of the driving member and driven pawl, Fig. 4 is a detail view of the driven pawl actuated by the friction clutch, Fig. 5 is a fragmental sectional detail view of the upper resilient end of a pawl, Fig. 6 is a vertical elevation of one part of the clutch mechanism showing the sliding drum for reversing the position of the pawl, Fig. 7 is a fragmental detail side elevation, partly in section, of the driven gear showing the means for shifting the drums for actuating the friction clutches, Fig. 8 is a view similar to Fig. 7 and at right angles thereto, Fig. 9 is a vertical end elevation of the clutch mechanism, and Fig. 10 is a detail sectional view of an axle loosely socketed to the driving shaft.

The friction clutch hereinafter to be described may be placed in application in many different situations, and for the purpose of illustration it will be shown upon a motor vehicle, the driving connection of which motor leads to a suitable casing disposed between the driven wheels of an automobile, and in which casing the clutch mechanism is securely mounted.

The casing is designated 1 and is held between the collars 2 and 3 mounted respectively upon the opposite ends 4 and 5 of the axle carrying the automobile wheels 6. The casings 1 may be dispensed with, if necessary, as shown in Fig. 3. From the motor not shown of the vehicle, a driving shaft 8 projects and is disposed in a sleeve 7, and mounted upon the free end of the shaft 8 within the casing 1 is a bevel wheel 9 meshing with a bevel wheel 10 disposed at right angles thereto and mounted upon an intermediate shaft 11 having formed at diametrically opposite ends the outwardly extending reduced cylindrical members 12 and 13 respectively, as clearly shown in Fig. 10. The driving shaft 11 has its cylindrical reduced members 12 and 13 disposed in correspondingly shaped recesses 15 formed within the ends 4 and 5 of the axle, and said shaft is inclosed by fixed bearings 14 disposed at opposite sides of the bevel wheel which is fixed upon the shaft 11.

Fixed upon the ends 4 and 5 of the axle are the spur wheels 17 having the integral outwardly-extending tubular offsets 18. It will be understood that the axles, including the intermediate shaft 11, are of uniform diameter, and that the offsets 18 are inclosed by the opposite walls of casing 2. The offsets 18 also surround the said axles. The teeth 18' of each spur wheel are arranged substantially as shown in Fig. 9 having the pawl receiving notches 19' substantially as shown in said figure providing clearance for either of the ends 21 and 22 of the substantially bell-shaped pawls 19 and 20 respectively, it being noticed that the end 21 of the pawl 20 will be disposed in one of the notches 19' so as to bear against one of the teeth 18' of the spur wheel 17 and the opposite end 22 of the pawl 19 will similarly enter one of the said notches to overlie another tooth so that when said pawls follow their cycle of movement to be described, the spur wheel will be driven by said pawls in the desired direction.

The pawls 19 and 20 are pivoted to the bolts 23 passed through the disk 42 and are spaced from said disks by means of the collars 24 bearing against said disk and mounted on each bolt, the nuts 25 holding each pawl against endwise displacement. Upon the pawls 19 and 20 disposed at opposite sides of the bolts 23 are fixed the pins 26 and 30 and 26' and 30' respectively to which are pivoted respectively the oppositely arranged horizontal flat ends 27 of the cup-shaped link 32, the intermediate concave portions being so arranged that clearance may be afforded between each link and the boss or hub 18 of the spur wheel 17. Suitably secured upon the top of the bell-shaped pawl 20 as in a recess 34 therein and held by pins 35, is an upwardly extending spring finger 33, having its outermost end held in a corresponding recess 36 formed upon the segmental shaped member 37 having elongated segmental slots 38 and 39 respectively into which project respectively the pins 40 and 41 fixed upon the disk 42 rotating with the intermediate shaft 11. It will be noticed that when the pawls 19 and 20 occupy the position shown in Fig. 9, the pins 40 and 41 will lie at the same relative end of the slots 38 and 39 so as to allow the member 37, when moved in and out of operative position, to set off equal interspaces from each pin to each appropriate end of each slot.

Fixed at one end of the member 37 is a pin 43 being secured to one end of a retractile spring 47 fixed at 48 to the disk 42. Mounted upon the disk 42 is an arm 49 pivoted near its free end at 50 to the disk 42 to have its rectangular outermost end 50' projecting above the periphery of said disk. The actuating end 50' of the lever arm projects in the path or range of movement of the drum 52, said drum 52 serving to force forwardly the projecting end 50' in order to tilt the rock lever 49 to cause the rack member 44 to move the toothed wheel pivoted at 48' upon a forwardly projecting post 47'. The drum 52 is larger in diameter than the disk over which it is arranged to slide so that the drum may engage the right-angular end 50' of arm 49 as it is slid over the disk.

It will be understood that the construction of the clutch members which are arranged at opposite sides of the driving bevel wheel is the same and means is provided for simultaneously advancing or retracting the oppositely arranged drums in order that the pawls may be shifted to allow for the reverse movement of the vehicle, or if in shifted position to allow said pawls to return to normal position. In Figs. 7 and 8 the means are shown connected to each of the drums 52 by the rectangular offsets 53 of the horizontally disposed rods 54 and 55 respectively, which are arranged to be moved toward and from the disks 42 over which the members 52 slide.

Upon the rods 54 and 55 are formed respectively rectangular terminal offsets 59 and 61 respectively which are secured respectively to one arm 58 and 60 of the bell crank levers 58' and 60' said levers being pivoted respectively at 65 and 70 to the posts 66 and 71 respectively which have convex portions 67 and 72 secured to the sleeve 14. The opposite arms of the bell crank levers 58' and 60' are designated respectively 62 and 68, and the arm 62 is pivoted to the terminal rectangular offset 64 formed upon the actuating rod 76 and also pivoted to said offset is an arm 63 of the bell crank lever 63' which is connected to the arm 62 by the connections hereinbefore described and not here mentioned. The arm 64 is pivoted to a terminal rectangular offset 73 formed upon a stepped portion 73' formed upon the cross rod 74, which at its free end is bent in the direction of the rod 76 and is secured thereto so as to move in unison therewith, and pivoted to said cross rod 74 is also an arm 69 of a bell crank lever connected as hereinbefore described to the arm 68.

The arrangement of the bell crank levers is such that the posts 66 and 71 elevate the connecting rods 64 and 65 above the driving wheel 10 as clearly shown in Fig. 7. The rod 76 may be disposed over the sleeve 7 connected to the casing 1 and so disposed as to be within easy reach of the operator.

In operation the device will be used as follows: When the pawls of each of the disks 42 which are arranged at opposite sides of the driving bevel wheel 10 are in the positions shown in Fig. 9 the motion of the vehicle will be in a forward direction and said motion will be communicated to the wheels 6 by means of the axles 4 and 5 upon which are fixed the spur wheels 17 which are driven by the pawls 19 and 20 pivotally mounted upon each of the disks 42, which are fixed upon the driving shaft 11 having its reduced end 12' rotatable in each of the axles 4 and 5. When the motor is started the bevel wheel 9 is rotated and serves to revolve the bevel wheel 10 which is fixed upon the driven shaft 11, and as said shaft rotates the disk 42 will obey its movement and thereby communicate motion to the pawls 19 and 20 which pawls being disposed in the recesses 19' of the spur wheels 17 and impinging against the appropriate teeth thereof will drive said spur wheels in one direction. When the vehicle is rounding a curve the tendency of the outer of the driven wheels to rotate faster than the inner wheel will be met by the pawls, since these pawls will yield under the relatively faster rotation of the outer wheel so as to allow said faster movement to occur. Assuming the wheel 6 to be the outer wheel it will rotate faster when the vehicle is rounding a curve, and it will be seen that its axle 5 will be free to rotate independently of the driving shaft 11 owing to the relation of the reduced cylindrical offset 12' formed upon said driving shaft and fitting a recess in said axle, and when the axle 5 rotates faster than the driving shaft 11 so will the spur wheel 17 fixed thereon, and as the spur wheel rotates, each of its teeth 18' will in consequence impinge against the ends 21 of the pawls 19 and 20 and under the yielding action of the spring tongues 33 mounted upon each of said pawls 20 will throw said pawls out of engagement with the teeth of the spur wheel thereby accommodating the spur wheel to the faster speed. It is obvious that when the spur wheel regains its normal speed, which is the speed imparted to it by the driving shaft 11, the ends 21 of the pawls 19 and 20 will be forced by the relaxation of the spring tongue 40 to drop or take into the recesses 19' of the said spur wheel and to impinge against the teeth thereof in order that said pawls may be effective to rotate said wheels at a uniform speed.

But one spring tongue 33 is formed upon the pawl 20 because owing to the link connections between the two pawls, the pawl 19 will obey the movement of the pawl 20. The means for shifting the pawl 20 and in consequence the pawl 19 so that the appropriate ends of said pawls may be brought into position against the teeth of the spur wheel 17 to reverse the movement of the vehicle will now be described.

The operator will grasp the rod 76 and move it rearwardly so as to tilt or rock in unison the arms 62 and 63, and 68 and 69 of the bell crank levers connected to the oppositely arranged drums 52 so that the arms 58 and 60 of the bell crank levers will move obliquely of the drum 14 and thereby cause the rods 54 and 55 to urge the drums 52 to slide over the disks 42, the tendency of said bell crank levers being when they are actuated to advance said arms into operative position. The outwardly extending tubular collars 57 are mounted upon the oppositely arranged bearings 14 over which are arranged to slide the collars 56 formed upon the drums 52, and as the sliding action of the drums takes place the peripheral edge of each of said drums will be forced forwardly and will impinge against the projecting end 50' of each arm 49 pivoted forwardly of each of the disks 42 and a tilting action will be exerted on each of said arms whereby each arm will be rocked. Normally each arm will be disposed in a vertical plane, the rack bar 44 projecting forwardly at its bottom so that the outermost teeth of said rack may engage with the toothed wheel 46. When the right angular arm 50 is moved forwardly by the drum 52, the lower end thereof will be caused to move inwardly toward the disk 42 and this will simultaneously move the rack bar 44 inwardly, thereby rotating clockwise the toothed wheel 46.

A pitman 47'' is pivoted respectively to the slide bar 37 at 49' and to the wheel 46 at 32' and serves, when the wheel is moved clockwise to shift said pitman so that it may urge said slide bar against the tension of spring 47, to the position shown in dotted lines in Fig. 9. As said member 37 is guided by the pins 40 and 41 working in the slots 38 and 39, the spring tongue projection 33 secured upon the pawl 20 will be caused to move in unison, which will turn said pawl 20 on its pivot 23. Said pawl 20 has previously been moved out of its recess in the spur wheel 17 as has the pawl 19 linked thereto owing to the sudden reversal of the motor mechanism but through the spring tongue 33 the pawl 20 will be moved by the slotted bar 37 into position so that the ends 22 of the pawls 20 and 19 will take into the appropriate recesses of said spur wheel 17 and impinge against the appropriate teeth thereof to cause the teeth to be moved by said pawl in a reverse direction of motion. The operator will hold his hand on the actuating rod sufficiently long until the pawls 19 and 20 shall have been put in motion and said wheels turned rearwardly, and when said rod 76 is moved to its normal position the bell crank levers will be returned to normal position thereby causing the drums 52 to be reversed and in consequence the peripheral edges thereof will move out of range of the ends 50' of the rock levers 49, allowing said levers to be returned to normal position. As the drums 42 are retracted, the retractile springs 46 will be relaxed thereby causing the slotted members 37 to move back to their original position, shown in full lines in Fig. 9, owing to the fact that the pitmen 47' will move said wheel 46 back to its original position and as the wheel rotates the rack bar 44 will be restored to its normal position so that the arm 49 will again be vertically disposed thereby moving the right angular end 50' over the disk 42 into projecting position thereover; as the member 37 is restored it will carry the spring tongue 33 and cause the pawl 20 to resume its normal position and in consequence the pawl 19 also. It will also be noticed that the action of the retractile spring which is put under tension when the pawls are shifted to allow of the reverse movement, tends to cause a more easy movement of the pawls which being arranged to drive the wheels by bearing against the teeth of the spur wheels 17 are apt to encounter considerable friction, which is thereby avoided by providing for the yielding action of the clutch and pawl mechanism.

Numerous modifications may be resorted to in practice without departing in principle from the invention disclosed, for example, the spring fingers 33 need not be used as a resilient shifting connection between the slotted members 37 and the pawl 20, but I contemplate using instead of these flat springs, any springs which in practice may be found more suitable to admit of greater compression, especially in cases where the flat springs will not withstand the action of the reversing mechanism by virtue of which the springs are subject to sudden jolts.

I claim and desire to secure by Letters Patent:

1. A device of the kind described comprising a driving shaft, a driven shaft held in alinement with said shaft, a disk mounted upon said driving shaft, a ratchet wheel on said driven shaft, diametrically opposite pawls mounted upon said disk and engaging with said ratchet wheel, said disk when revolving causing said pawls to turn said ratchet wheel in one direction, means on said disk for shifting said pawls to cause them to turn said wheels in an opposite direction, a drum on said shaft slidable over said disk and actuating said last-named means, and means for moving said drum in and out of operative position.

2. In combination a driving shaft, a driven shaft loosely socketed thereto, a disk fixed upon the driving shaft, a ratchet wheel fixed upon the driven shaft, pawls pivoted to said disk at diametrically-opposite points of and engaging with said ratchet wheel, means for causing said pawls to move in unison, said disk when revolving causing said pawls to turn said ratchet wheel in one direction, means for holding said pawls in position to turn said wheel, a slidable member projecting above the periphery of said disk arranged to shift said pawls to cause them to turn said wheel in an opposite direction.

3. In combination with a driving and a driven shaft, said driven shaft being independently rotatable, a disk fixed upon the driving shaft, a ratchet wheel fixed on the driven shaft, double toothed pawls pivoted upon said disk, means for moving said pawls in unison, a rocking bar arranged to hold one tooth of each pawl in operative position to rotate said ratchet wheel, means projecting above the periphery of said disk for actuating said rocking bar, a drum slidable over said disk engaging said projecting means to actuate it, and means for moving said drum into and out of engagement.

4. A device of the kind described comprising a driving and an independently rotatable shaft, a disk mounted on the driving shaft and a ratchet wheel on the driven shaft, a double-toothed pawl pivoted to said disk, each tooth adapted to engage with said ratchet wheel according to the direction of movement of said disk, a rockbar mounted on said disk, a resilient arm on said pawl actuated by said rock-bar to cause said pawl to be shifted to an opposite position, a drum slidable over said disk, means actuated by said drum arranged to operate said rock bar, and means for actuating said drum.

In testimony whereof I affix my signature in presence of two witnesses.

DAVID REDMOND BARRY.

Witnesses:
J. S. Barry,
R. J. Beck.